June 16, 1936.  P. R. GLASS  2,044,501
STARTING AND STOPPING MECHANISM
Original Filed Aug. 10, 1933    2 Sheets—Sheet 1
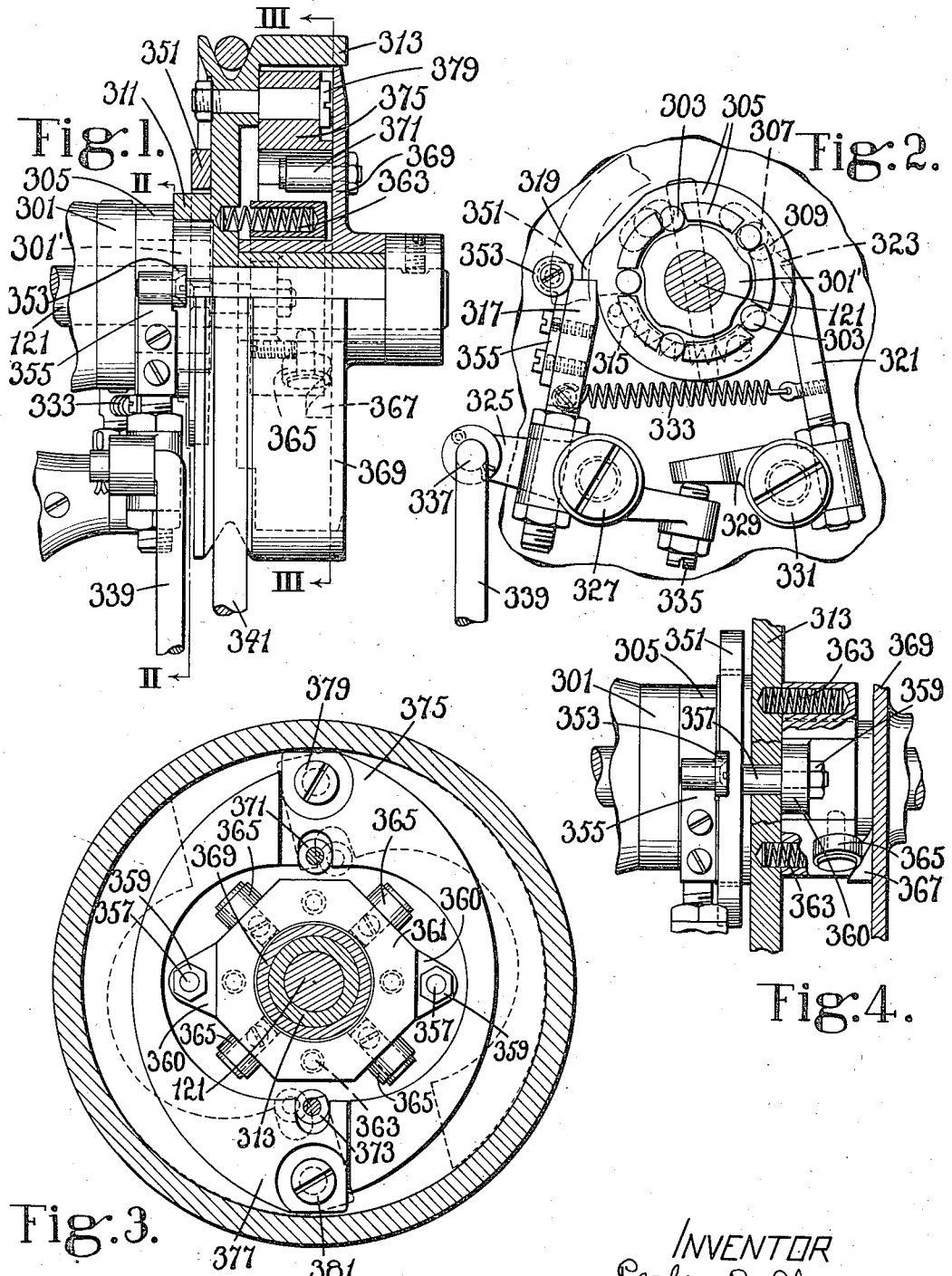

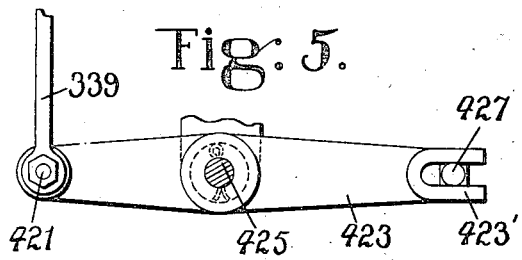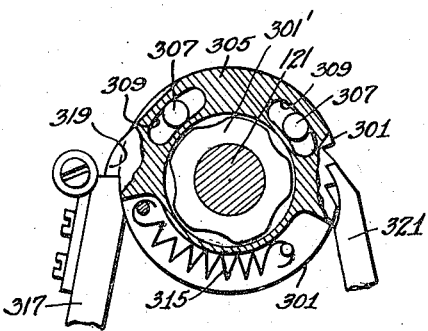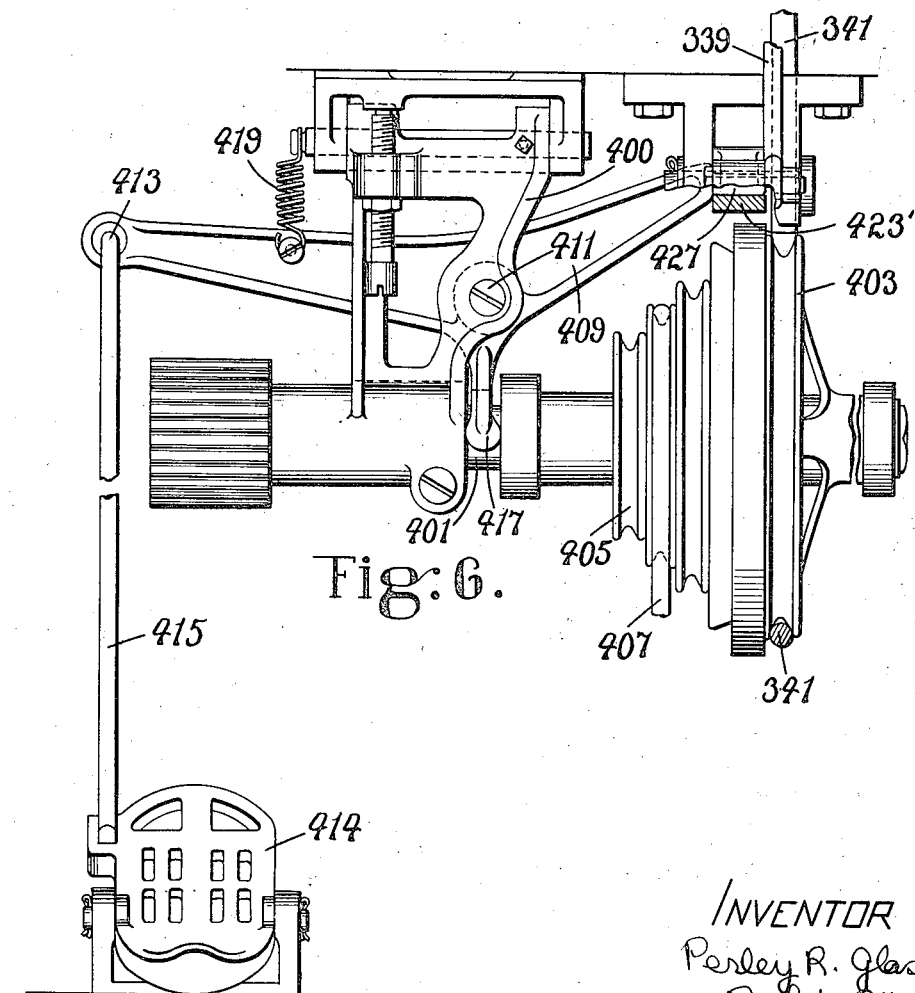

Patented June 16, 1936

2,044,501

UNITED STATES PATENT OFFICE 2,044,501

STARTING AND STOPPING MECHANISM

Perley R. Glass, Salem, Mass., assignor to United Shoe Machinery Corporation, Paterson, N. J., a corporation of New Jersey Original application August 10, 1933, Serial No. 684,542. Divided and this application May 31, 1934, Serial No. 728,237

13 Claims. (Cl. 192—147)

This invention relates to starting and stopping mechanisms and particularly to a mechanism for preventing a high speed machine from being stopped, after the driving power has been withdrawn from its driving pulley, until the speed of the machine has been reduced to a point where it may be safely stopped without injury or undue shock to its parts.

The mechanism, as illustrated, is designed for use with the folding machine shown in applicant's co-pending application Serial No. 684,542, filed August 10, 1933, of which this application is a division. The mechanism may, however, be used in other types of machines where such a mode of operation is desirable.

Folding machines, of the type referred to, are used for folding the margins of pieces of sheet material which are to be used in the manufacture of boots and shoes. These machines are commonly run at a comparatively high speed, the driving shaft running at the rate of 1000 or more revolutions per minute. In order to stop the rotation of the shaft accurately and safely, with the shaft always in the same angular position, there is provided, in accordance with a feature of the invention, a mechanism which, upon withdrawal of power from the driving pulley that drives the shaft, prevents the stopping mechanism from becoming effective until the shaft has slowed down to a predetermined rate of rotation. In the illustrated construction, a clutch connects the shaft and a pulley by which it is driven. Depression of a treadle throws in the clutch and applies power to the driving pulley to rotate the shaft at high speed. When it is desired to stop the rotation of the shaft, the treadle is released. This immediately withdraws power from the driving pulley and tends to throw out the clutch, but a centrifugal device, mounted on this pulley, prevents the clutch from being thrown out until the driving pulley and the shaft have slowed down to a predetermined rate of rotation. When this reduced rate of speed has been reached, the clutch is automatically thrown out and the shaft comes to rest.

This and other features of the invention, including certain details of construction and combination of parts, will be described as embodied in the illustrated mechanism and pointed out in the appended claims.

Referring now to the accompanying drawings, Fig. 1 is an elevation of the mechanism of the present invention, parts of the upper portions of this mechanism being shown in section;

Fig. 2 is a vertical section on the line II—II of Fig. 1;

Fig. 3 is a vertical section on the line III—III of Fig. 1;

Fig. 4 is a detail, partly in section and partly in elevation, of a part of the mechanism;

Figs. 5 and 6 are details of the sewing machine transmitter and associated mechanism for applying power to and withdrawing power from the shaft of the mechanism of the present invention, and for controlling the clutch thereof; and Fig. 7 is a sectional view of some of the parts shown in Fig. 2.

The shaft 121 of the machine, and which is also that of the present invention, is driven at comparatively high speed and is so connected with its driving mechanism that, when power is withdrawn from it, it comes to rest always in the same angular position, with the parts of the machine stopped in the proper position to remove a completed portion of a piece of work and to insert a new portion thereof or a new piece.

Referring to the drawings, the manner in which the rotation of the shaft 121 is controlled will be described. This shaft, which is driven through a clutch of the well-known Horton or roller type, has fast to it a collar 301 having a hub 301' provided on its periphery with a plurality of cams with which cooperate rollers 303 carried by a roller cage 305, which encircles the hub 301', and which has a loose connection therewith by pins 307 carried by the collar 301 and projecting into slots 309 in the roller cage. This pin and slot connection serves to hold the hub and the roller cage in assembled relation if these parts are removed from the machine and it also serves to limit the relative rotation between the collar 301 and the roller cage 305. Surrounding the roller cage is a cylindrical extension 311 (Fig. 1) projecting from the left-hand face of a driving pulley 313 which has its hub rotatably mounted on the shaft 121. A tension spring 315 acts, when permitted to do so, to rotate the roller cage forwardly with respect to the shaft and cause the rollers to ride up on the cams on the hub 301' until they are wedged between these cams and the inner surface of the cylindrical extension 311, whereupon the shaft is driven by the pulley. In the position of rest shown in Fig. 2, the shaft 121 has been disconnected from the driving pulley 313 by reason of the fact that a stop arm or controller 317, movable in a plane perpendicular to the shaft, has been brought into the path of, and then into engagement with, a lug 319 on the roller cage and has stopped its rotation. After the stopping of the roller cage, the momentum of the driven parts still continues the rotation of the collar 301, and puts the spring 315 under increased tension while the pins 307 in the collar 301 move forward until they strike the forward ends of the slots 309 in the already stopped roller cage 305, thus also stopping the collar and the shaft 121. With the forward rotation of these parts stopped, the stretched spring 315 tends to contract and move the shaft 121 and collar 301 backward. To prevent any substantial backward movement under these conditions, due principally to said stretch of the spring 315 and also to the natural rebound of the parts, a pawl 321 is provided which moves yieldingly into contact with ratchet teeth 323 formed on the periphery of the collar 301. The pawl 321 moves into contact with the ratchet teeth at the same time that the stop arm 317 is brought into the path of the lug 319, as will be explained hereinafter. Thus, forward movement of the shaft and parts is permitted by the pawl under momentum but substantial backward movement is prevented by the engagement of the pawl with one of the ratchet teeth. The clutch mechanism, as thus far described, is old and well-known, and any suitable clutch mechanism, controlled in a manner presently to be described, may be employed.

The arrangement whereby the pawl 321 and stop arm 317 are moved simultaneously will now be explained. The stop arm 317 is adjustably fastened to a lever 325 pivoted at 327 to the frame; and the pawl 321 is similarly fastened to a lever 329 pivoted at 331 to the frame. A tension spring 333 connects the stop arm and the pawl, and an adjustable abutment screw 335 threaded through the inner end of the lever 325 engages the under side of the inner end of the lever 329. The outer end of the lever 325 is pivotally connected at 337 to the upper end of a rod 339 which is urged upwardly at all times by a spring, in a manner presently to be described. Thus, with the construction as thus far described, if the rod 339 is pulled down, the stop arm 317 and the pawl 321 are both withdrawn from operative position and the clutch is thrown in to connect the pulley 313 with the shaft 121; and, if the rod 339 is released, the stop arm 317 and the pawl 321 are moved into the operative position shown in Fig. 2, to throw out the clutch and stop the shaft always in the same angular position.

The shaft 121 is rotated at high speed, i. e. at 1000 or more R. P. M., as has been stated, when it is connected to the pulley 313 through the clutch, the pulley being driven by a belt 341 from a sewing machine transmitter which is started by a depressing movement of a treadle 414, which movement also pulls down the rod 339, as will be fully described later, to engage the clutch.

The above high speed is attained almost instantly, but it is not feasible, however, to throw out the clutch and stop the rotation of the shaft suddenly, from such high speed, in the manner which has been described and, accordingly, the stop arm 317 is prevented from returning to the stopping position, shown in Fig. 2, until the pulley has slowed down to a comparatively low speed, for example, 350 R. P. M.

When it is desired to stop the rotation of the shaft 121, the treadle 414 is released, whereupon a spring 419 (to be described later) rocks the treadle sufficiently to withdraw power from the pulley 313 and would rock it far enough to allow the rod 339 to swing the stop arm 317 into stopping position to engage the lug 319 (Fig. 2) on the roller cage, if permitted to do so. The stop arm 317, however, is prevented from returning to stopping position until the shaft 121 slows down to a given speed, for example, 350 r. p. m. It is prevented by a guard which, in the illustrated embodiment of the invention, consists of a ring 351, which although normally in the position or location shown in Fig. 1, has been moved by the action of centrifugal force as soon as the shaft 121 attained a speed greater than 350 R. P. M., parallel to the shaft 121 into the location shown in Fig. 4, and remains there as long as the shaft continues to rotate at, or above, such a velocity. In this position, the guard or ring 351 is in the path of a small roll 353 carried by a small bar 355 which is rigid with the stop arm 317, so that the stop arm, upon release of the treadle, will carry the roll 353 against the peripheral surface of the ring 351 and the stop arm 317 will be held from swinging in and engaging the lug 319 of the roller cage. When, however, the shaft 121 slows down sufficiently, springs, to be described, overcome the reduced centrifugal force and move the ring 351 (parallel to the shaft) out from under the roll 353. The stop arm 317 will then be permitted to swing in and the shaft will be brought to rest when the lug 319 strikes the stop arm 317.

The ring 351 has projecting horizontally from it two rods 357 which are slidable through bores in the wall of the pulley 313. The rods have threaded outer ends of reduced diameter provided with nuts 359; and between these nuts and the shoulders of the studs are clamped two ears 360 formed on a block or carrier 361. Located partly in sockets in the carrier and partly in alined sockets in the wall of the pulley are a plurality of compression springs 363 (hereinbefore referred to) which tend at all times to move the ring 351 into, and to hold it in, the inoperative position shown in Fig. 1. In order to move the ring 351 parallel to the shaft 121 into the operative position shown in Fig. 4, the block 361 carries four small rolls 365 which are adapted to be engaged respectively by four wedges (one of which is shown at 367 in Figs. 1 and 4) carried by a disk 369, the hub of which is mounted on the hub of the pulley 313 for a partial or limited rotation relatively thereto. When, therefore, the disk 369 is partially rotated through a small arc on, and relatively to, the hub of the rotating pulley 313, these wedges engage the rollers and push the ring 351 to the left into the position shown in Fig. 4. This small movement of rotation of the disk 369 is caused by means of centrifugal force (as will be described below) generated by the rotation of the pulley 313 whenever the rate of rotation is above 350 R. P. M. When the shaft and pulley slow down to 350 R. P. M., the springs 363, through the wedges 367, act to turn the disk 369 back to initial position and to return the ring 351 to the inoperative position shown in Fig. 1, so that the roll 353 may swing past it and permit the clutch controlling mechanism to stop the shaft 121. The disk 369 carries on its inner face two diametrically opposite rolls 371, 373 which are received in recesses formed respectively in two weighted arms 375, 377 pivoted respectively at 379, 381 to the pulley. These two arms are shown in Fig. 3 in full lines in the positions which they occupy when the shaft 121 is at rest and in dotted lines in the positions which they occupy when the shaft is rotating at more than 350 R. P. M. In their movements from full to dotted line positions, they turn the disk 369 somewhat upon the shaft 121 and the wedges 367 push the ring 351 to the position shown in Fig. 4, as previously described. Although, for convenience, the lower limit of speed of the shaft 121 has been stated to be 350 R. P. M., it should be noted that this limit depends upon the strength of the springs 363 so that, by replacing the springs with others of different strength, the lower limit of speed may be varied.

Referring to Figs. 5 and 6, the treadle-controlled mechanism for applying power to the pulley 313 and simultaneously pulling down on the rod 339, and for subsequently withdrawing power from the pulley and releasing the rod 339, will now be described. This mechanism includes a so-called sewing machine transmitter of usual form, which is adapted to be bolted to the under side of the bench upon which rests the machine with which the mechanism of the present invention is used. The transmitter consists of a frame 400 having mounted therein a rotary shaft 401 having fast thereto a pulley 403 to receive the belt 341 (which drives the pulley 313) and loose on the shaft 401 is a three-step pulley 405 which is driven continuously by a belt 407 from any suitable source of power. A lever 409, pivoted near its middle at 411 to the frame 400 of the transmitter and connected at its outer end at 413 to a treadle rod 415, has a depending fork 417 which straddles the shaft 401 and engages the hub of the stepped pulley 405. A tension spring 419 normally holds the lever 409 in the position shown, in which the cooperating friction faces of the stepped pulley 405 and the pulley 403 are not in engagement. When the treadle 414, which is attached to the lower end of the treadle rod 415, is depressed, the fork 417 pushes the stepped pulley 405 to the right and connects it frictionally with the pulley 403 to apply power thereto and thus drive the belt 341 and pulley 313. When the treadle 414 is released, the parts return to the positions shown and power is withdrawn from the pulley 403 and consequently from the pulley 313. The construction and mode of operation of the transmitter, as thus far described, are old and well known.

The lower end of the rod 339 (Fig. 5) is pivotally connected at 421 to one end of a horizontal lever 423 which extends at right angles to the shaft 401. This lever 423 is pivoted near its middle at 425 to a stationary member and has at its other end a fork 423' to receive a pin 427 carried at the inner end of the lever 409. With this construction, when the treadle 414 is depressed to apply power to the pulley 313, as just explained, the clutch between the pulley 313 and the shaft 121 is also thrown in by the downward movement of the rod 339; and, when the treadle 414 is released and power is withdrawn from the pulley 313, the rod 339 is urged yieldingly upward by the spring 419 so that the clutch will be thrown out as soon as the shaft 121 slows down to 350 R. P. M.

Although the invention has been set forth as embodied in a machine of a particular type, it should be understood that the invention is not limited in its scope to such type of machine.

Having described the invention, what I claim as new and desire to secure by Letters Patent of the United States is:

1. The combination with a rotary shaft of a driver therefor, means for applying power to said driver to rotate it at a given rate, means for stopping the shaft always in the same angular position, and a member movable parallel to the shaft for holding the stop means inoperative, after power has been withdrawn from the driver, until the shaft has slowed down to a predetermined rate of rotation.

2. The combination with a rotary shaft of a driver therefor, a clutch between the shaft and the driver, a controller movable into one position to throw in the clutch and into another position to throw out the clutch and stop the shaft in a definite angular position, and means operated by centrifugal force for preventing the clutch from being thrown out as long as the shaft rotates at or above a predetermined rate.

3. The combination with a rotary shaft of a driver therefor, a roller clutch between the shaft and the driver, said clutch including a roller cage, a controller movable into one position to free the roller cage and throw in the clutch and into another position to engage the roller cage and throw out the clutch, and means operated by centrifugal force after the clutch has been thrown in for preventing the clutch from being thrown out as long as the shaft rotates at or about a predetermined rate.

4. The combination with a rotary shaft of a high speed rotary driver therefor, a clutch between the shaft and the driver, a controlling member movable into one position to throw in the clutch and into another position to throw it out and stop the shaft in a definite angular position, and means, controlled by the rate of rotation of the shaft when the clutch has been thrown in by movement of the controlling member into one position, to prevent said member from being moved into the other position as long as the shaft continues its high speed rotation.

5. The combination with a rotary shaft of a driver therefor, a clutch between the shaft and the driver, a controller movable into one position to cause engagement of the clutch and into another position to cause its disengagement and stopping of the shaft in a definite angular position, a guard movable to prevent or permit movement of the controller into one of said positions, and means for moving the guard so that it will either prevent or permit movement of the controller, said means being operated by changes in the speed of the driver.

6. The combination with a rotary shaft of a driver therefor, a clutch between the shaft and the driver, a controller movable into one position to cause engagement of the clutch and into another position to cause its disengagement and stopping of the shaft in a definite angular position, a guard movable to prevent or permit movement of the controller into clutch disengaging position, and means for moving the guard so that it will either prevent or permit movement of the controller, said means being operated by changes in the speed of the driver.

7. The combination with a rotary shaft of a driver therefor, a clutch between the shaft and the driver, a controller movable in a plane perpendicular to the shaft into one position to cause engagement of the clutch and into another position to cause its disengagement, a guard movable parallel to the shaft to locations where it will either prevent or permit movement of the controller into clutch disengaging position, and centrifugally operated means for moving the guard parallel to the shaft to either of said locations.

8. The combination with a rotary shaft of a driving pulley therefor, a clutch between the shaft and the driving pulley, a controller movable into one position to cause engagement of the clutch and into another position to cause its disengagement, and a guard ring movable by an increase in the speed of the pulley to a location when it will prevent movement of the controller into clutch disengaging position and movable by a decrease in said speed to a location where it will permit such movement.

9. The combination with a rotary shaft of a driving pulley therefor, a clutch between the shaft and the driving pulley, a controller movable into one position to cause engagement of the clutch and into another position to cause its disengagement, a guard movable parallel to the shaft to locations where it will either prevent or permit movement of the controller into clutch disengaging position, weights pivotally mounted on the pulley, and connections between the weights and the guard for moving the guard by changes in centrifugal force to either of said locations.

10. A mechanism for operating a clutch guard ring for preventing and permitting the operation of a clutch disconnecting and stopping device, comprising a shaft, a driving pulley, a plurality of rods slidably mounted in the pulley parallel to the shaft, a clutch guard ring secured to the ends of the rods, a carrier secured to the opposite ends of the rods, a plurality of rolls mounted on the carrier, a disk mounted for limited rotation about the pulley, wedges mounted on the disk to engage the rolls and slide the carrier, rods and guard ring parallel to the shaft upon partial rotation of the disk relatively to the pulley, and weights pivotally mounted on the pulley and connected to the disk to cause its said partial rotation when changes in speed of the pulley cause pivotal motion of the weights by centrifugal action.

11. The combination with a rotary shaft of a driving pulley therefor, a clutch between the shaft and the driving pulley, a controller movable into one position to cause engagement of the clutch and into another position to cause its disengagement, a guard ring movable parallel to the shaft to locations where it will either prevent or permit movement of the controller into clutch disengaging position, a plurality of rods slidably mounted in the pulley parallel to the shaft, the guard ring being secured to the ends of the rods, a carrier secured to the opposite ends of the rods, a roll mounted on the carrier, a disk mounted for limited rotation about the pulley, a wedge mounted on the plate to engage the roll, and weights pivotally mounted on the pulley and connected to the disk, all being so constructed and arranged that, when the weights move outwardly by centrifugal force, the disk is given a limited rotation to cause the wedge to act on the roll and slide the carrier, rods and guard ring parallel to the shaft so that the guard ring will be in a location to prevent the controller from moving into clutch disengaging position until the speed of the pulley is reduced to a definite point.

12. The combination with a rotary shaft of a driver therefor, a clutch between the shaft and the driver, a controller movable by the operator into one position to throw in the clutch and movable automatically into another position to throw out the clutch when permitted by the operator, and means operated by centrifugal force for preventing the clutch from being thrown out automatically as long as the shaft rotates at or above a predetermined rate.

13. The combination with a rotary shaft of a high speed rotary driver therefor, a clutch between the shaft and the driver, a controlling member movable into one position to throw in the clutch and movable automatically into another position to throw it out when permitted by the operator, and means, controlled by the rate of rotation of the shaft after the clutch has been thrown in by movement of the controlling member into one position, to prevent said member from being moved automatically into the other position as long as the shaft continues its high speed rotation.

PERLEY R. GLASS.

CERTIFICATE OF CORRECTION.

Patent No. 2,044,501.  June 16, 1936.

PERLEY R. GLASS.

It is hereby certified that error appears in the printed specification of the above numbered patent requiring correction as follows: Page 3, second column, line 28, claim 3, for the word "about" read above; and that the said Letters Patent should be read with this correction therein that the same may conform to the record of the case in the Patent Office.

Signed and sealed this 20th day of October, A. D. 1936.

(Seal)

Leslie Frazer
Acting Commissioner of Patents.